United States Patent [19]

Kornylak

[11] 3,768,624

[45] Oct. 30, 1973

[54] ELASTIC BELT CONVEYOR
[75] Inventor: Andrew T. Kornylak, Ohio 45011
[73] Assignee: Kornylak Corporation, Hamilton, Ohio
[22] Filed: Feb. 11, 1972
[21] Appl. No.: 225,599

Related U.S. Application Data

[63] Continuation of Ser. No. 42,094, June 1, 1970, abandoned.

[52] U.S. Cl.................. 198/1, 198/204, 104/165
[51] Int. Cl............................................ B65g 15/60
[58] Field of Search.................... 198/1, 204, 168, 198/184; 104/204, 172, 167

[56] References Cited
UNITED STATES PATENTS
3,381,800  5/1968  Everett ........................ 198/204
3,508,495  4/1970  Mirel............................. 104/172 B
3,357,368  12/1967  Fonden...................... 104/172 BT
3,024,740  3/1962  Peras............................. 104/172 L
3,666,076  5/1972  Miller............................... 198/1
3,490,386  12/1966  Oranczak................... 104/172 BT
3,164,245  1/1965  Juengel........................... 198/204
3,679,040  7/1972  Kretzschman..................... 198/1

Primary Examiner—Richard E. Aegerter
Attorney—Jay M. Cantor

[57] ABSTRACT

A belt type conveyor for transporting loads. A tube is formed with a track in one surface to support and guide an endless belt. The return run is carried in the tube. The outer surface of the belt is engaged with the load to propel it from one station to another.

4 Claims, 8 Drawing Figures

INVENTOR
ANDREW T. KORNYLAK

BY Harold L. Halpert
AGENT

INVENTOR
ANDREW T. KORNYLAK

BY Harold L. Halpert
AGENT

ELASTIC BELT CONVEYOR

This is a continuation of application Ser. No. 42,094, filed June 1, 1970 now abandoned.

This invention relates to a conveyor and more particularly to a flexible belt conveyor.

It is an object of this invention to provide a conveyor comprising a flexible belt which provides a positive drive connection with a load.

It is a further object of this invention to produce a conveyor as aforesaid which can move a load over long distances.

It is a further object of this invention to produce a conveyor as aforesaid which is not limited to a pendant type support for a load.

Figure 1:
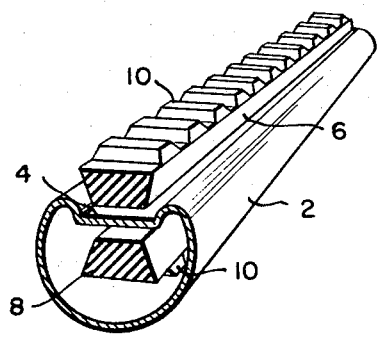
Figure 2:
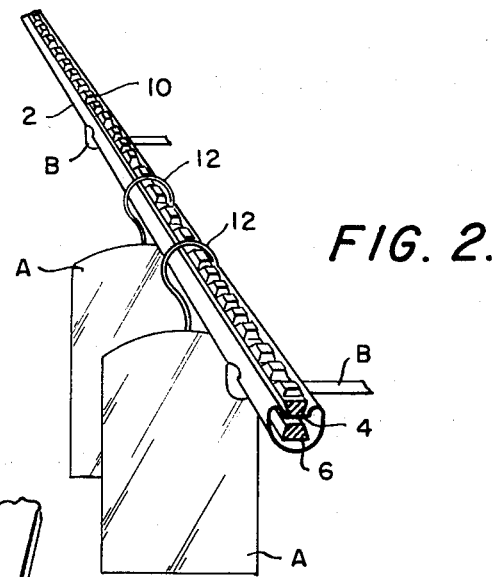
Figure 3:
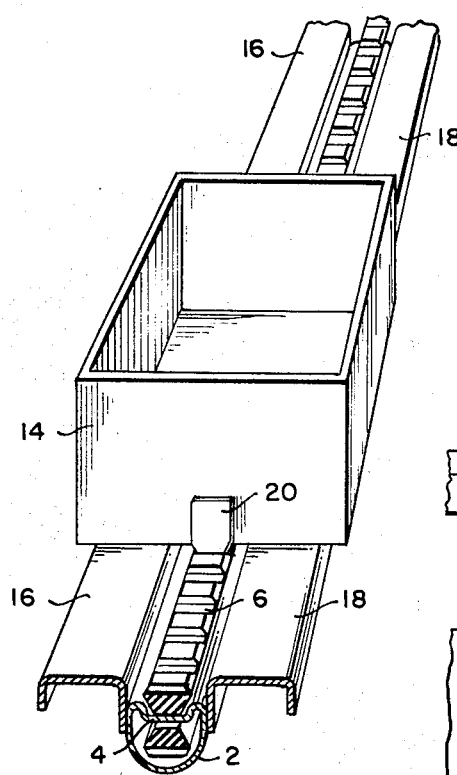
Figure 4:
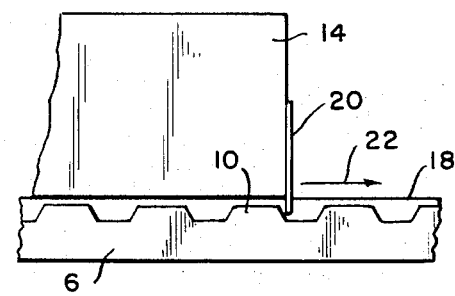
Figure 5:
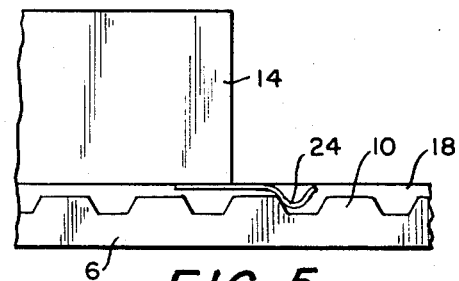
Figure 6:
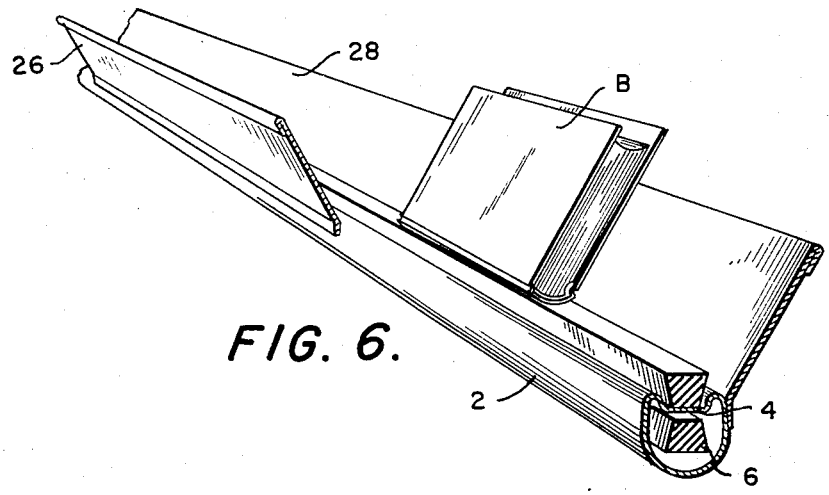
Figure 7:
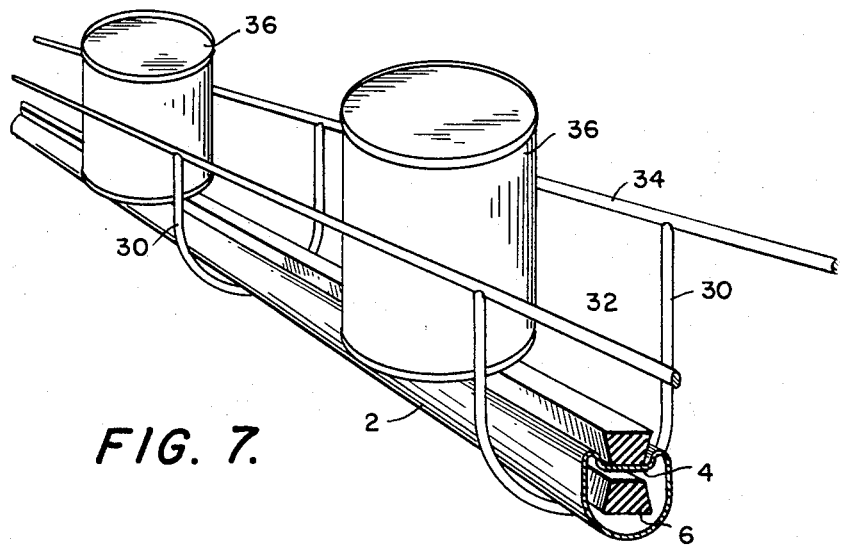
Figure 8:
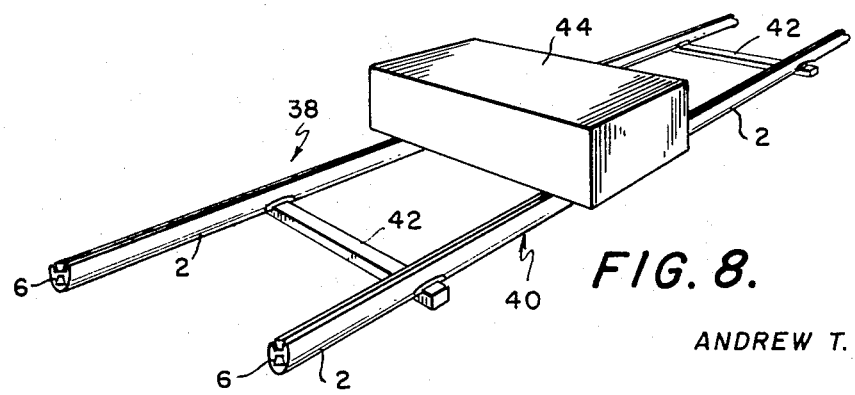

These and other objects of this invention will become manifest upon reading the following description in conjunction with the accompanying drawings wherein:

FIG. 1 is a fragmentary perspective and sectional view of one form of the invention, FIG. 2 is a view showing the use of the conveyor illustrated in FIG. 1, FIG. 3 is another form of the invention in which the load is supported above the belt, FIG. 4 is a view in side elevation of the form of the invention shown in FIG. 3, FIG. 5 is a side elevation of a modification of FIG. 3, FIG. 6 is a perspective sectional view of another form of the invention, FIG. 7 is a fragmentary sectional view of another form of the invention, and FIG. 8 is a fragmentary view of another form of the invention.

In accordance with the invention a tube is deformed to form a supporting channel on the outer surface for one run of a belt. The return run is carried in the tube. In one form of the invention a guide arrangement supports the load during transport of the load on the surface of the belt. In another form of the invention the belt is used as the drive while the weight of the load is supported on adjacent support surfaces. In a third form of the invention the load supporting surface of the belt is corrugated to provide a more positive drive to a load which is to be moved from one level to another.

With reference to the drawings there is illustrated in FIGS. 1 and 2 a conveyor comprising a tube 2 formed with a depressed portion to define a channel 4. An endless belt 6 (only a segment of which is shown) is supported in the channel and has the return run 8 in the tube. One surface of the belt is formed with cleats 10 to define a corrugated surface. A load in the form of a number of articles A is supported by hooks 12 fitted between the cleats. This arrangement provides a positive drive to the load and allows the conveyor to support the load while moving along steep inclines. The tube is supported by brackets B positioned along the length thereof. A number of tubes are joined end to end and curved in desired patterns to form a conveyor which can move pendant type supported loads over selected paths.

In FIG. 3 there is illustrated a conveyor arrangement in which a carrier 14 is slidably mounted on supports 16 and 18 secured as by welding to opposite sides of tube 2. The tube is formed with a channel 4 and an endless belt 6 as described above. A cantilever spring 20 secured at one end to the carrier 14 has a free end mounted between a pair of cleats 10. Movement of the belt in the direction of the arrow 22 will engage the spring to drag the carrier over the surfaces of 16, 18. In the event of an obstruction, or by deliberate stopping of the carrier to prevent movement over the supports, the spring will yield to allow the belt to continue running.

In FIG. 5 a leaf spring 24 is secured to the underside of the carrier and is formed with bight portion to engage a cleat. The spring will yield to permit the belt to pass when the carrier is obstructed. The bottom of the bight portion is shown smooth and rounded so as to slidably contact the top surfaces of the cleats with a minimum of friction.

In FIG. 6 there is illustrated a conveyor comprising a tube 2 formed with a depressed portion to define a channel 4. An endless belt 6 is supported in the channel and has a return run in the tube all as heretofore described. A pair of plates 26, 28 are secured to opposed sides of the tube, as by welding, and are inclined to form a trough for guiding an article along the tube. In the illustration the article which comprises the load is indicated as a book B wich is carried by the belt and supported by plate 28.

In FIG. 7 the tube 2 and belt 6 are arranged as described above. However, in this form of the invention a series of U-shaped brackets 30 are secured to the tube as by welding and mount parallel guides 32, 34 secured thereto by welding. In the illustration the articles which form the load are cans 36 which are held vertically as they move along the conveyor from station to station.

In FIG. 8 is illustrated a conveyor comprising a pair of parallel tracks 38 and 40 held in spaced relation by spacers 42 welded to the tubes 2. Each track is formed as a tube and belt such as described above. A load shown as a block 44 is carried by the belts.

The specific means for driving the belts is not part of this invention and is therefore not illustrated. However, any well known means can be used.

I claim:

1. A conveyor comprising an elongated support comprising a pair of transversely spaced rails, a flexible belt and means supporting said flexible belt for longitudinal movement between the rails, the upper exposed surface of the belt being transversely corrugated to provide longitudinally spaced alternate depressions and projections in the said exposed surface, the uppermost surfaces of the projections being below the rail surfaces, a carrier movably supported on the rails and provided with stiffly resilient means yieldable longitudinally of the belt projecting into the depression between a pair of projections for driving the carrier by contact with the forward wall of the adjacent projection upon movement of the belt, said stiffly resilient means being yieldable upon restraint of the carrier against movement by the belt to permit the belt to move relative thereto, a rigid tubular member extending along and between the rails, the undersuface of the belt being supported on the outer surface of the tubular member and the return run of the belt being within the tubular member.

2. A conveyor according to claim 1 wherein the resilient means includes at least one leaf spring connected at one end to the carrier and projecting therefrom with its free end portion in the depression between two projections.

3. A conveyor according to claim 2 in which the free end portion of the spring extending into the depression is formed with a bight which has a rounded bottom to ride on the surfaces of the projections when the carrier is restrained against movement.

4. A conveyor according to claim 3 wherein said spring has stiffness in a direction transverse to the direction of movement of said belt.

* * * * *